2,763,541
Patented Sept. 18, 1956

2,763,541
VACUUM CARBON REDUCTION OF TUNGSTIC OXIDE

John D. Mettler, Jr., Niagara Falls, N. Y., assignor to Union Carbide and Carbon Corporation, a corporation of New York No Drawing. Application June 18, 1953,
Serial No. 362,668

2 Claims. (Cl. 75—.5)

This invention relates to a process for producing tungsten metal. More particularly, this invention relates to a process of producing substantially pure tungsten metal of a controllable, very small particle size, by carbon reduction at reduced pressure.

The principal object of this invention is to produce tungsten metal of a high degree of purity and of a controllable particle size of less than 10 microns, by heating at definite and controlled rates, at reduced pressure, a mixture of tungstic oxide and carbon.

In the present state of the art, high-purity, fine particle size tungsten powder is produced by reduction of tungstic oxide in an atmosphere of dry hydrogen. Due to the production of water as one of the reaction products, in order to maintain a relatively dry hydrogen atmosphere, either a large excess of hydrogen must be used or large volumes of hydrogen must be continually dried and recirculated through the reduction chamber. Further, since reduction by this process depends on hydrogen diffusing into the bed and water diffusing out of the bed, relatively thin layers of oxide must be charged. Maintaining a relatively dry hydrogen atmosphere in this process is, in itself, expensive and this, coupled with low production rates imposed by the necessity of charging thin layers, renders the process very costly.

Tungsten oxides have been reduced by carbon and carbon compounds, such as methane and carbon monoxide, at normal atmospheric pressure. But the metal thus produced is suitable only for alloying with steel, being coarse-grained and of low purity. By means of the present invention, tungsten is obtained as an extremely fine powdery product, the particle size of which may be readily controlled. Further, if pure $WO_3$ is employed, a high-purity metal is obtained, analyzing at least 99.5% tungsten metal.

Briefly, the process comprises mixing finely divided oxides of tungsten, such as tungstic trioxide ($WO_3$), and carbon and heating under controlled reduced pressure and at a regulated rate. The proportion of carbon to tungstic oxide was experimentally determined and is slightly less than stoichiometrical. Hydrogen derived from the volatile matter in the carbon effects some reduction of $WO_3$, thus slightly decreasing the amount of carbon required. However, the reduction of tungstic oxide by the hydrogen is incidental to the main reaction and is not essential in the practice of the present invention. It is important to note that the capacity of the pumping equipment must be sufficient to maintain the pressure below 5000 microns; otherwise, the heating rate must be lowered and, since the heating rate regulates the particle size, it is preferable to have this the independent variable.

At atmospheric pressure, a temperature in excess of 1050° C. is required for the reaction between carbon and tungsten oxide to proceed. By properly controlling the pressure within the furnace, the temperature at which the reaction will proceed can be lowered to 800° C., although higher temperatures are desirable to ensure complete reduction of all oxide at significant rates. Reaction at this low temperature causes the product particle size to be fine. In this process the particle size of the resultant product is controlled by the rate of heating above 800° C. which in effect controls the amount of metal reduced at the low temperature. The temperature is maintained at about 800° C. for two hours, following which it is increased at regular rates to under 1200° C. and then held at the maximum temperature attained until the reaction is complete. Cooling may take place in a vacuum, an inert atmosphere of argon, helium, etc., or a complete or partial atmosphere of a reducing gas, such as $H_2$ or CO or mixtures of $H_2$ or CO with A, He, $N_2$.

Metal produced under the above procedure will analyze at least 99.5% W and contain not more than 0.3% carbon + oxygen. The particle size will average between 1.0 and 1.5 microns.

The following data show the effect of heating rate above 800° C. upon particle size:

| Heating Rate, °C. per Hour | Product Particle Size in Microns | |
|---|---|---|
| | Range | Average |
| 15 | 0.6–0.85 | 0.72 |
| 20 | 1.75–2.45 | 2.0 |

The sizes of the $WO_3$ and C charged have not been found to be related to the particle size of the reduced metal.

The thickness of the layer charged to the furnace is also important since it affects the uniformity of the temperature distribution with the mass and this in turn determines the direction in which the reaction $$CO_2 + C \rightleftharpoons 2\ CO$$

will go in different portions of the charge. This reversible reaction is capable of transporting carbon from one part of the charge to another, thus resulting in incomplete reduction of the $WO_3$ in the first part and an excess of carbon in the other. From this it can be seen that uniform heating is important. Layers appreciably greater than 2 inches deep could not be satisfactorily reacted, however, as many as three 2-inch layers were successfully processed.

The above reversible reaction is also influenced by the pressure within the furnace. The pressure should be maintained at a sufficiently low value to prevent formation of $CO_2$ by disproportionation of CO and tungsten oxides. Although successful results can be obtained with furnace pressures up to 5000 microns, we prefer for ease of control to maintain pressures below 2000 microns throughout the period of increasing temperature.

A preferred method of the invention is set forth as follows:

One hundred pounds of pure tungstic oxide analyzing 99.9% $WO_3$ is milled with fifteen pounds, six ounces of thermatomic carbon (a cracked hydrocarbon product analyzing 99.14% fixed carbon, 0.86% volatile matter and 0.01% ash). The mixture, placed in graphite trays 2 inches deep, is charged into the furnace and the furnace sealed. The internal pressure is reduced to less than 1000 microns of mercury and the furnace heated rapidly to 400° C. Between 400° C. and 800° C., the furnace temperature is raised at the rate of 100° C. per hour, then held at 800° C. for two hours to thoroughly equalize the temperature and initiate the reaction. During this period the internal furnace pressure is maintained below 1000 microns. After holding at 800° C. for two hours, the furnace temperature is raised at the low rate of 15° C. per hour until a temperature of 1100° C. is reached, the internal pressure being maintained below 2500 microns. The temperature is maintained at 1100° C. until the reaction is complete, as indicated by a low, constant internal pressure approximately equivalent to the minimum obtainable with available equipment—about 200 microns.

The system is then allowed to cool under recirculated $N_2+H_2$ at a pressure of 2 inches of mercury to a maximum of 125° C. before admitting air to the furnace. The product, after discharge, is subjected to light milling in order to disperse metal powder aggregates.

The metal produced in the above example analyzed:

| | Percent |
|---|---|
| W | 99.65 |
| $O_2$ | 0.19 |
| C | 0.05 |

The particle size averaged 1.15 microns.

Although the method set forth above is the preferred method, it should be noted that the procedure listed may be varied somewhat, all within the scope of the invention.

What is claimed is:

1. In the art of producing powdered tungsten metal by the carbon reduction of oxidic tungsten at sub-atmospheric pressures, wherein a reaction gas product of CO is formed, the improvement of effecting tungsten particle sizes between 0.5 and 10 microns without entrainment in said reaction gas product, said improvement comprising mixing in powder form carbon and oxides of tungsten, heating said mixture at a pressure below 5 mm. of mercury up to a reducing temperature of approximately 800° C., heating said mixture up to approximately 1200° C. at a heating rate between 15° C. per hour and 20° C. per hour, to form readily disintegrable aggregates of substantially pure tungsten, and cooling said mixture in a non-oxidizing atmosphere to retain said aggregates in their elemental form, whereby said aggregates may be subsequently disintegrated into a pulverulent mass of finely divided tungsten.

2. A process of producing substantially pure tungsten metal, having a particle size in the range from 0.5 microns to 10 microns, which comprises mixing oxidic tungsten (calculated as $WO_3$) and carbon in proportions approximately one hundred parts to approximately fifteen parts, by weight, respectively, and heating said mixture at a pressure below 5000 microns of mercury, so as to rapidly reach a temperature of 400° C., increasing the temperature to about 800° C. at a rate of about 100° C. per hour, maintaining the temperature at about 800° C. for about two hours, increasing the temperature to about 1100° C. at a rate of about 15° C. per hour, and maintaining the temperature at about 1100° C. until the reaction is complete, followed by cooling said mixture in a non-oxidizing atmosphere.

References Cited in the file of this patent
UNITED STATES PATENTS
2,242,759     Schlecht  ---------------  May 20, 1941